United States Patent
Mahajan et al.

(10) Patent No.: US 10,753,882 B1
(45) Date of Patent: Aug. 25, 2020

(54) INSPECTION AND COSMETIC GRADING THROUGH IMAGE PROCESSING SYSTEM AND METHOD

(71) Applicant: Griffyn Robotech Private Ltd., Pune (IN)

(72) Inventors: Amit Anil Mahajan, Cumming, GA (US); Samir Shriram Bagalkote, Pune (IN); Ameya Anil Jathar, Pune (IN); Vidula Premanth Alhat, Pune (IN); Nikhil Subhash Warokar, Nagpur (IN); Deepak Anand, Aurangabad (IN)

( * ) Notice: Subject to any disclaimer, the term of this patent is extended or adjusted under 35 U.S.C. 154(b) by 0 days.

(21) Appl. No.: 16/445,620

(22) Filed: Jun. 19, 2019

(30) Foreign Application Priority Data

Apr. 10, 2019  (IN) .............................. 201921014438

(51) Int. Cl.
| | |
|---|---|
| *G01N 21/88* | (2006.01) |
| *G06T 7/62* | (2017.01) |
| *G06T 7/00* | (2017.01) |
| *G06T 7/521* | (2017.01) |
| *H04N 7/18* | (2006.01) |

(52) U.S. Cl.
CPC ....... *G01N 21/8851* (2013.01); *G06T 7/0002* (2013.01); *G06T 7/521* (2017.01); *G06T 7/62* (2017.01); *H04N 7/18* (2013.01); *G01N 2021/8858* (2013.01); *G01N 2021/8861* (2013.01); *G01N 2021/8874* (2013.01); *G06T 2207/10152* (2013.01); *G06T 2207/20081* (2013.01); *G06T 2207/20084* (2013.01)

(58) Field of Classification Search
CPC ....... G01N 21/8851; G01N 2021/8858; G01N 2021/8874; G01N 2021/8861; G06T 7/62; G06T 7/00002; G06T 7/0002; G06T 7/521; G06T 2207/10152; G06T 2207/20084; G06T 2207/20081; H04N 7/18
USPC .......................................... 348/128
See application file for complete search history.

(56) References Cited

U.S. PATENT DOCUMENTS

| | | | |
|---|---|---|---|
| 5,455,870 A * | 10/1995 | Sepai | G01N 21/95684 382/147 |
| 9,805,458 B2 | 10/2017 | Parsons et al. | |
| 10,169,858 B2 | 1/2019 | Humphrey et al. | |
| 2001/0030296 A1* | 10/2001 | Ishimaru | G01N 21/474 250/559.4 |
| 2004/0133369 A1* | 7/2004 | Pack | G03F 1/84 702/59 |
| 2005/0264590 A1* | 12/2005 | Yong | B41J 3/407 347/2 |
| 2010/0060902 A1* | 3/2010 | Wornson | G01N 33/386 356/601 |
| 2011/0171415 A1* | 7/2011 | Eda | C03C 19/00 428/64.2 |

(Continued)

*Primary Examiner* — Tung T Vo
(74) *Attorney, Agent, or Firm* — Lynn Holly

(57) ABSTRACT

A system and method for inspection and cosmetic grading of objects is provided. Camera and lighting assemblies capture images of an object and create a 2D composite image which is processed by an image processing module with a deep learning machine algorithm to detect surface defects in the object. Detected defects are localized and measured for depth of defect by an advanced optical sensor, providing a 3D representation of defects. A cosmetic grading algorithm determines the cosmetic grade of the object and the optimal path of disposition for the item based on the grade.

10 Claims, 14 Drawing Sheets

(56) References Cited

U.S. PATENT DOCUMENTS

| | | | | |
|---|---|---|---|---|
| 2012/0330447 | A1* | 12/2012 | Gerlach | G01B 11/24 |
| | | | | 700/95 |
| 2014/0267691 | A1* | 9/2014 | Humphrey | G06T 7/0008 |
| | | | | 348/125 |
| 2016/0116419 | A1* | 4/2016 | Pavani | H04N 7/181 |
| | | | | 348/87 |
| 2016/0210737 | A1* | 7/2016 | Straub | G06T 7/001 |
| 2016/0364851 | A1* | 12/2016 | Konishi | G01N 21/8851 |
| 2017/0186148 | A1* | 6/2017 | Uemura | G06T 7/0004 |
| 2018/0023947 | A1* | 1/2018 | Meng | G01B 11/25 |
| | | | | 348/46 |
| 2018/0071788 | A1* | 3/2018 | Anup | B07C 5/342 |
| 2018/0122060 | A1* | 5/2018 | Shirkhodaie | G06T 7/0008 |
| 2018/0130197 | A1* | 5/2018 | Weiss | H04N 5/2256 |
| 2018/0209916 | A1* | 7/2018 | Terasawa | G03F 1/84 |
| 2018/0213134 | A1* | 7/2018 | Wu | H04N 5/2256 |
| 2018/0232875 | A1* | 8/2018 | Kanodia | G06T 7/0004 |
| 2018/0342050 | A1* | 11/2018 | Fitzgerald | H04N 7/18 |
| 2019/0094150 | A1* | 3/2019 | Obata | G01B 11/30 |
| 2019/0096057 | A1* | 3/2019 | Allen | G06T 7/0008 |
| 2019/0107495 | A1* | 4/2019 | Shafiei | G01N 21/8806 |
| 2019/0331608 | A1* | 10/2019 | Terasawa | G01N 21/8851 |

* cited by examiner

INSPECTION AND COSMETIC GRADING THROUGH IMAGE PROCESSING SYSTEM AND METHOD

CROSS-REFERENCE TO RELATED APPLICATION AND CLAIM OF PRIORITY

This application claims priority under 35 U.S.C. § 119(a) to Indian Patent Application Serial No. 201921014438 which was filed on Apr. 10, 2019 in the Indian Intellectual Property Office, the entire disclosure of which is incorporated herein by reference.

FIELD OF THE INVENTION

The presently disclosed technology relates generally to an improved system, method and device for the detection, identification, analysis and grading of surface defects in two and three dimensions.

BACKGROUND OF THE INVENTION

Sellers of products with secondary markets may maximize the value of an item supplied from reverse logistics processes by determining an optimal path of disposition (e.g. resale as-is, replace parts and resell, buff and polish and resell, etc.) for each returned item. For items that are in good working order, cosmetic inspection and analysis aid to determine the optimal path of disposition by assigning a cosmetic grade to an item based upon specified criteria. Cosmetic grades may be developed by the seller, industry groups or others. An example of an "A" grade item that may be resold as-is, might be an item with fewer than two small surface defects, while a grade "D' item may have severe surface defects, either requiring a part replacement or may need some operation, such as buff and polish, for removal of surface defects and preparation for resale. Each dispositional path has a different cost to the seller.

Product specifications that cover a product's appearance, look and feel, colour, texture and superior defect-free surface finish are important cosmetic features. Surface defect inspection is an important part of cosmetic quality checks in, for example, smart devices. A traditional method may involve manual visual inspections that lack accuracy and speed of inspection. Additionally, visual inspection provides limited information about surface defects such as count and apparent measurement of size of a defect in two dimensions. It does not fully characterize a surface defect. In order to fully characterize the defect, determination of depth becomes more important than just a visual assessment. Without information regarding the depth of a defect, it may be impossible to determine whether replacement, processing or salvage is the optimal path. For example, a buff and polishing process can't eliminate a defect that cuts the surface of an item to a depth reaching to bulk material below. Cosmetic grading machines, devices or methods known in the art do not provide the size of defect in three dimensions. The present application discloses a system and method for determining the true characterization of a defect, and hence the item's optimal dispositional path, and offers other advantages over the prior art.

SUMMARY OF THE INVENTION

In a preferred embodiment, an object is presented to the system and method disclosed herein. A camera assembly captures a comprehensive set of images of the object from all sides and orientations. A lighting assembly is operatively connected to the camera assembly, with the lighting assembly adjusting itself upon receiving signals from the camera assembly regarding optimal lighting conditions. Image processing software processes the images, stitching together various images to provide a full, two-dimensional view of the object. Image capture and processing software determines the center of the object evaluation area, and other object attributes such as size and color, from an initial image; further images allow the processing software to identify defects; calculate the coordinates of the defect relative to the center of the object evaluation area; and identify the length and width of each defect. The defect coordinates may be provided to a device handling assembly which then aligns each defect in line with an optical sensor for defect depth measurement. It aligns the defect at a position of highest reflected light intensities and measures the depth at that location. The system may capture the defect details, images and cosmetic grade according to a cosmetic grading scheme and provides the data to an external system for optimal disposition of an item.

Some embodiments may configure the system components in alternative ways in order to accommodate the evaluation of objects of different sizes, materials, and other properties.

The features, functions and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

The accompanying drawings, which are included to provide a further understanding of the disclosed embodiments and are incorporated in and constitute a part of this specification, illustrate exemplary embodiments and together with the description serve to explain the principles of the disclosed embodiments.

DETAILED DESCRIPTION OF THE INVENTION

Figure 1:
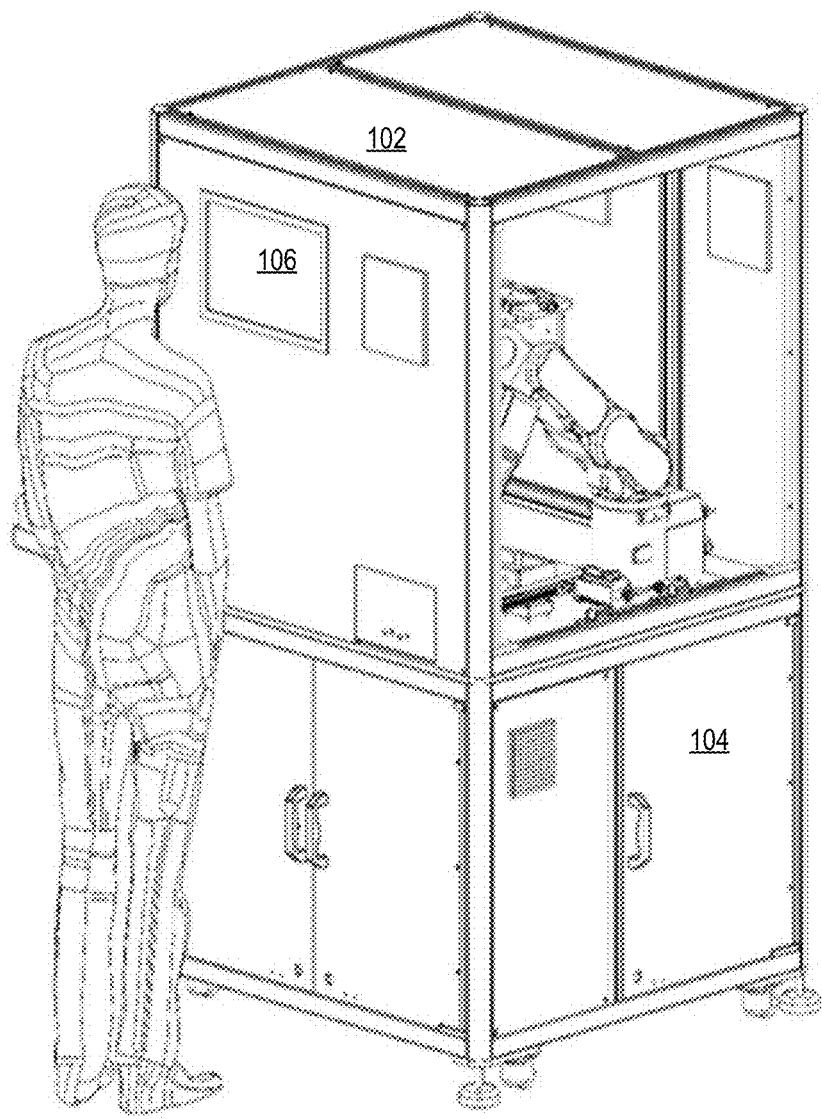
FIG. 1 illustrates a standalone system for inspecting small objects or items consistent with this disclosure.

Embodiments of the claimed subject matter will now be described more fully with reference to the accompanying drawings, in which some, but not all embodiments are shown. The subject matter disclosed may be embodied in many different forms and should not be construed as limited to the embodiments set forth herein; rather, these embodiments are provided so that the disclosure may satisfy legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein. The terms "objects", "product" and "items" are used synonymously and interchangeably in this disclosure. A "customer" may be an individual or organization requesting the services of a system and method consistent with this disclosure. A "user" may be the operator of such a system. The terms "inspection" and "evaluation" are used interchangeably and synonymously in this disclosure. An "evaluation area" is that part of the object for which images are captured and processed. The term "apparatus" refers to physical and software components of a system or subsystem being described. It is well-known to those of ordinary skill in the art that software refers to computer-executable instructions, residing in non-transitory memory of a computing device which when executed by the computing device processor performs or causes the physical components to perform as the instructions direct.

An inspection and cosmetic grading system and method may evaluate the surface of an object for defects. The term "surface" as used herein refers to the outside part or uppermost layer or layers of an object, with a depth of at least the depth of a defect, but with no maximum or minimum limits on the depth of the "surface." The surface may include multiple layers of the same or different material(s). The depth of a surface is defined specifically for each item being evaluated. For example, an iPhone 6 mobile device screen consists of at least 8 layers of material. If a defect cuts through all 8 layers and into the device below, all the layers of the screen and the device below may be considered the surface for the purposes of this disclosure.

An inspection and cosmetic grading machine as disclosed herein may comprise four modular subsystems: an image capturing apparatus, image processing module, object/material handling components, and depth sensing apparatus. Each may have its own control device and software. Image capture apparatus includes modular hardware components, such as camera (lens, image sensor) and lighting systems that may be interchanged for evaluating products of different sizes, colors, materials and expected defect size and type. Together, an image capture subsystem and image processing module comprise the major components of a machine vision system. Machine vision systems create images by analyzing the light reflected from an object. Lighting techniques (e.g. back lighting, axial diffuse lighting, dark field illumination, bright field illumination, etc.) comprise a light source and its placement with respect to the object and the camera. Choice of lighting techniques also depends on the object being evaluated and the goals of the evaluation.

An image processing module may involve the use of a processor and memory, with computer-executable instructions which when executed by the processor extract information from an image signal provided by an image capture apparatus. Image processing algorithms may acquire information from the camera, pre-process the image for optimization and ensure that the desired features are conspicuous. An algorithm may be designed to locate the specific features that are the subject of the analysis, run measurements and make comparisons. An image processing system may incorporate machine learning and deep learning algorithms to make the comparisons. Trained machine learning and deep learning systems can quickly and accurately identify the type of surface defects consistent with those described herein.

Object conveyance or handling components may comprise hardware to attach to, or grip, the object in order to position the object in front of the image capturing subsystem in various positions and orientations, either under its own programming or under the direction of feedback from the machine vision or other component. Object handling systems may be any kind of robotic assembly, hard automation or mechanical apparatus suited for a system consistent with this disclosure and the object being evaluated. Robotic assemblies may use any type of effector, for example, a claw, or one or more types of gripper effector such as magnetic, vacuum, slide or other type of gripper depending on the object to be evaluated.

In preferred embodiments, an advanced optical sensor provides depth measurement for detected defects. An advanced optical sensor may measure displacement from a plane using a sensor comprised of a set of lenses and light, sending a signal to a sensor controller which calculates the depth measurement.

In some embodiments the system may further comprise logic programmed to apply an established cosmetic grade level or category to an evaluated object. Some industries publish standards for the cosmetic grading of an item in order to ensure consistency across products going to secondary markets. For example, the CTIA™, an organization supporting the wireless industry, sets standards for wireless device grading scales which allow any seller in any secondary market of devices to universally identify cosmetic condition and other graded features. Cosmetic grading categories may be created for objects depending on many factors, including the type of object, the presence of defects, number and/or type of defects or damage to the object, and the ability to repair the item or replace parts within a certain cost or capability range. Grading logic may also provide a dispositional path (e.g. send to salvage, send for repair of screen, send for repair of casing, etc.) for the object. In an embodiment consistent with this disclosure, defects or damage present in and on surfaces may be assessed and the length, width and depth measured. Attributes of defects on an object may determine the cosmetic grade and/or which of several dispositional paths the object may take. The logic for grading rules, categories and paths that support a customer's needs may be programmed into a system and method consistent with this disclosure, either as an internal component, an external component, or a combination of internal/external with an integration to an external system using application programming interfaces (APIs) or other data transfer method known to those of ordinary skill in the art.

FIG. 1 illustrates a standalone system 100 for inspecting small objects or items consistent with this disclosure. In this disclosure, terms related to the "size" of objects may be considered relative to the size and configuration of the system. For example, a small system sized to handle small items, a large system sized for larger items, a very large system sized to handle very large items, etc. In other words, the system and method may be practiced on "small" items, such as watches, mobile phones, tablets, small television screens, etc. in a system sized for small items; "larger" items, such as a large screen TV in a system sized for larger items, and "very large" items, such as a car, in a system sized for very large items. Examples of smaller objects suitable for this system and method may include mobile phones, watches or other wearables, monitors, television screens, touch screens for medical devices, laptops, tablets, e-readers, portable gaming devices, GPS units, and many more. Surfaces may be comprised of glass, gorilla glass, CRT, LCD, plasma, OELD, plastic, silicone and/or other polymeric materials, as well as many combinations of materials. Embodiments of the system and method are contemplated for objects of all sizes and may be realized by alternative placement of hardware components. Regardless of the size of an object or a system, the components remain the same, but may be placed in different configurations and with alternative uses made of some components, but all fall within the embodiments as described herein.

Referring again to FIG. 1, an inspection and cosmetic grading assembly 100 which may be appropriate for small objects or devices may be comprised of an enclosure 102 housing the system components. The enclosure may be constructed of an opaque, non-reflective material. An enclosure around the assembly allows the highest quality images to be created by the system and may act as a safety barrier for the system and serve to prevent dust and other debris from accumulating on object or component surfaces. A control cabinet 104 may be included to contain servers, controllers, motors, cables, and other system hardware that may be located in close proximity to their respective components. A computing device 106 with access to the graphical user interface to the system's control software, may be mounted on the enclosure for a user to provide input, observe images or processing screens, or override or otherwise control the system, if desired.

Figure 2:
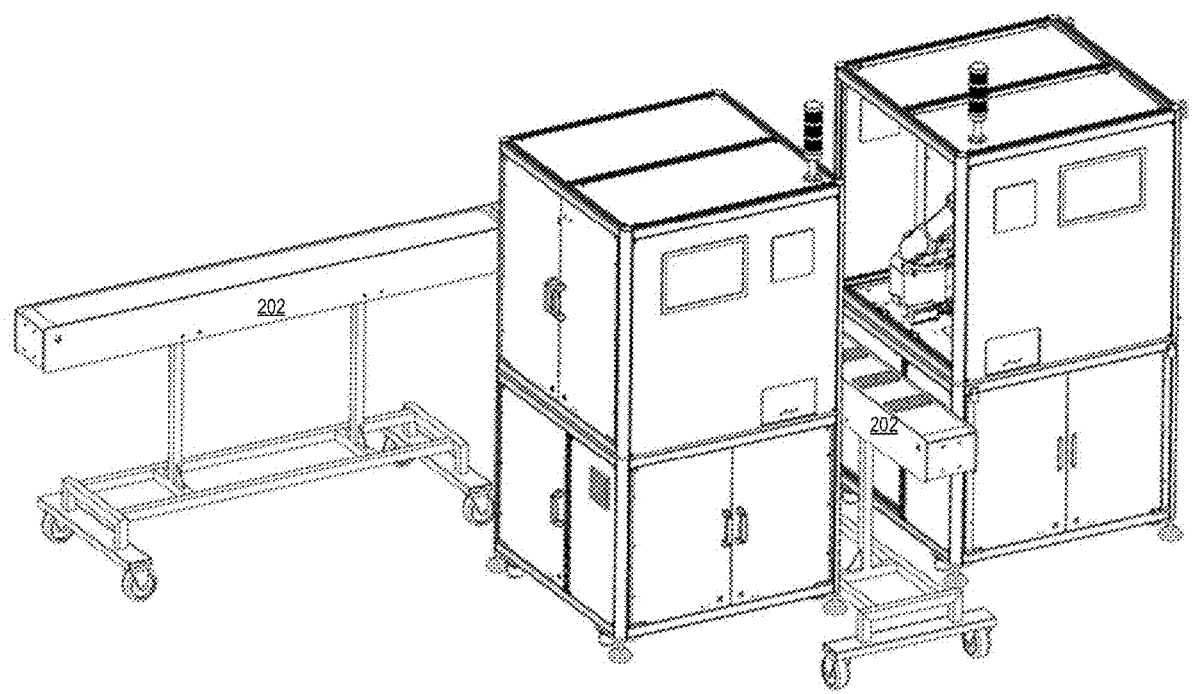
FIG. 2 illustrates a pair of standalone systems with a conveyor apparatus.

FIG. 2 illustrates a set of inspection and cosmetic grading units 100 with an external conveyance system 202 which transports an object to a unit for evaluation. A conveyance system may comprise frames supporting rollers, wheels or belts and may be motor powered or manual devices.

Figure 3:
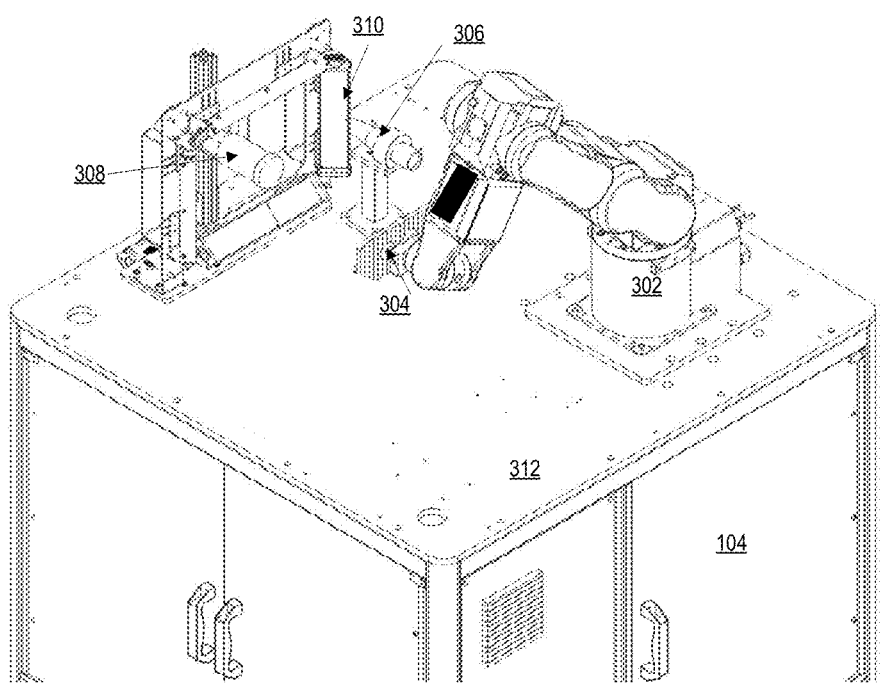
FIG. 3 illustrates the system's primary hardware components.

Referring now to FIG. 3, the system's primary hardware components may reside within the enclosure. Primary hardware components may comprise: an automated object control system (here, a robotic arm 302) with mounting and gripping device 304, an optical sensor 306, a plurality of cameras 308, and light assemblies 310 (light mountings, lights, light adjustment slide).

A base plate 312 may provide a mounting area for the system components. An automated object control system 302 may be equipped with various effectors and used for various purposes in an inspection and cosmetic grading system and method. For example, a system for processing small objects may comprise a robotic arm 302 as automated object controller with vacuum or other effector suitable for attaching to, lifting, rotating and flipping the object, positioning the object in front of a light 310 and camera assembly 308 multiple times in order to get a complete image of all sides and angles of the object. When non-collaborative robotic arms 302 are included in an embodiment, safety features such as automatic stop when enclosure doors are opened, may be built into the system. In some embodiments, vacuum, conveyance, pneumatic and safety subsystems may be included. Enclosures may be equipped with video cameras to allow users to observe the process.

Referring again to FIG. 3, in certain embodiments, a light assembly 310 may be comprised of a set of lights mounted on a mounting structure. Lighting may be chosen to provide optimal illumination to detect defects on an object surface. Lighting requirements (e.g. distance, color and intensity) may be dependent upon several things, including lighting geometry, light source type, wavelength, surface property of the object to be inspected or measured (e.g. color, reflectivity, texture or materials of construction), object shape, speed of application, the object's distance from the camera and angle of incidence, mechanical constraints and environment considerations. In some embodiments, properties of the object required to make lighting decisions may be determined at the time of evaluation and stored as an object profile record in memory. However, those properties also may be part of an object or device profile provided by the customer via API or other data transfer method prior to evaluation.

Objectives of lighting 310 selection may be to contrast the features that must be inspected or measured, minimize contrast of features that are of no interest, and remove unwanted variations caused by ambient light and differences between objects that are not relevant to inspection. Some embodiments, therefore, may include an easily removable and replaceable lighting assembly 310 to accommodate lighting determined optimal for a variety of surface material, object and image capture attributes. In a preferred embodiment, a lighting assembly 310 may be provided that is capable of providing multiple lighting techniques, including backlighting, dark field illumination and bright field illumination and others. The lighting controller may receive feedback or indication of optical qualities and measurements and adjust lighting accordingly. Lighting 310 may be adjusted in a particular object orientation to account for differences in object properties, such as differences in construction materials. For example, lighting for a mobile device screen may not provide the conditions required for the device border around the screen and therefore requires adjustment as the object is reoriented for image capture.

As was described above, in some embodiments, cameras 308 may be mounted on a camera mount or automated object control system. Cameras and lenses 308 may be selected for their attributes, such as the number of megapixels, their sensor and processor properties, the optical quality of the lens best suited for the desired object to be processed, the expected working distance from the object and the expected defect sizes.

Figure 4:
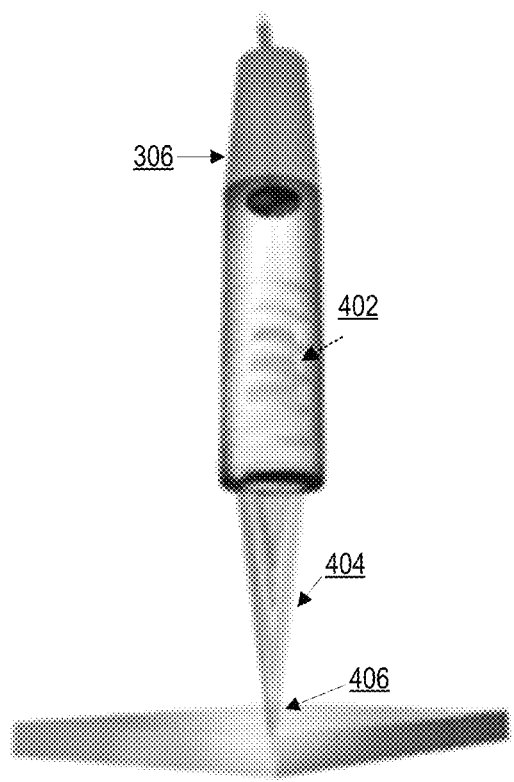
FIG. 4 illustrates an exemplary advanced optical sensor.

An advanced optical sensor 306 allows measurement of displacement, the depth of a defect or the height of a protrusion. As was discussed previously, in addition to length and width, the depth of a defect is required in order to determine the defect character and optimal disposition of an object. In a preferred embodiment, an advanced optical sensor 306 subsystem may be provided to measure displacement, distance and/or position of defects provided by the image processing system. Optical sensors may measure displacement in a variety of surface materials and may filter out interference such as reflections on shiny surfaces. FIG. 4 provides an illustration of an exemplary advanced optical sensor 306. The sensor may comprise a controller, a light source and a set of lenses 402 that fragment the light into wavelengths and form a conical beam 404, creating an optical spot 406 used to measure the defect. An advanced optical sensor may be used on each object to measure depth directly, or it may be used to collect training data for an image processing and analysis module, which may allow the algorithm to determine the depth at a certain value of reflected light intensity with very high accuracy, or both. Depth measurement may account for a significant amount of the time the object is under analysis, and therefore throughput is greatly improved by training the image processing module to correlate depth to reflected light intensity.

Figure 5:
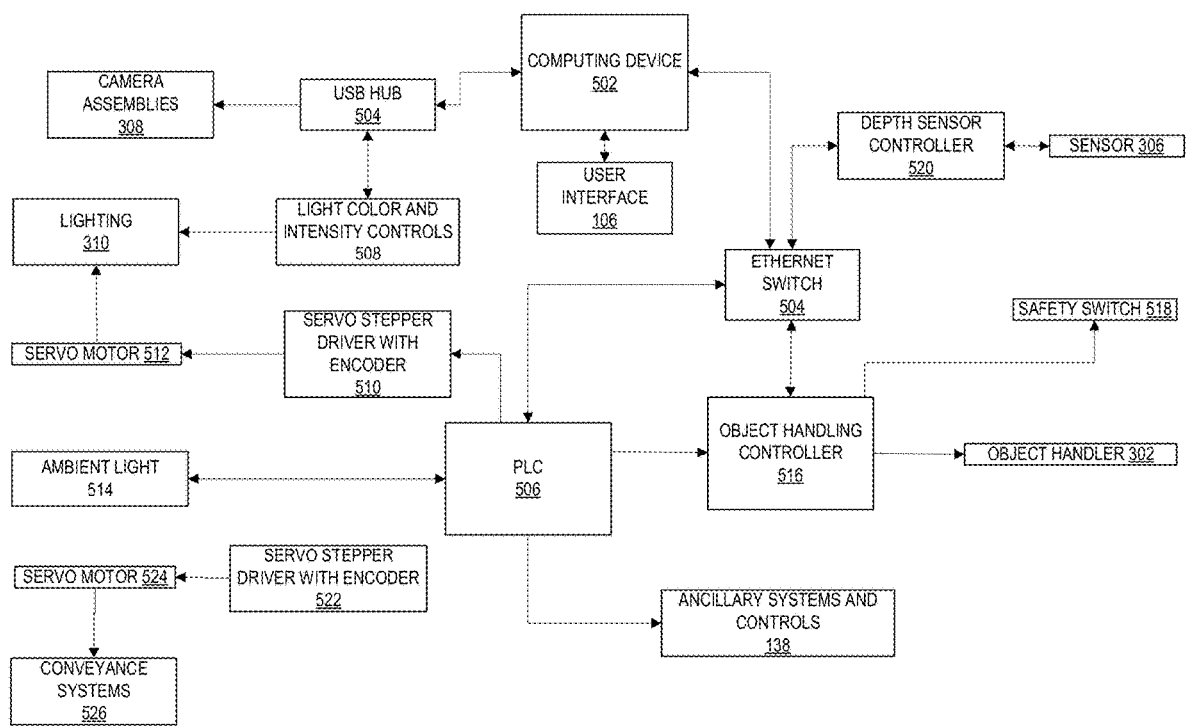
FIG. 5 is a block diagram illustrating exemplary top-level hardware system architecture of a system consistent with this disclosure.

FIG. 5 is a block diagram illustrating an exemplary top-level hardware system architecture of the disclosed system and method. A computing device 502 provides computational services, a graphical user interface 106 allowing a user access to programming, controls and view of system performance; machine learning and image processing modules, access to all embedded software for hardware component controllers (e.g. camera, lights, and sensors) and communications between components 504. A Programmable Logic Controller (PLC) 506 performs all tasks related to embedded software control systems, including camera assemblies and controls 308, lighting 310 and light motion control systems 508, 510, 512, ambient light system 514, automated object controller 302, 516 and safety 518 system, depth sensor controller 520 and sensor 306, object conveyance or feeding 202, 522, 524 and 526. The automated object controller 516 performs automated object motions, movements and object pick, place and handling functions. Ancillary systems 528 may be optional or required subsystems known to those of ordinary skill in the art to support other systems or subsystems, including, for example, pneumatics and vacuum systems in support of conveyance 202, placement mechanisms or automated object control 302 and sensor 306 and safety systems. In some embodiments, the PLC 506 and automated object control assembly 516 may be visualized as children or workers to the computing 502 device as parent or manager.

Figure 6:
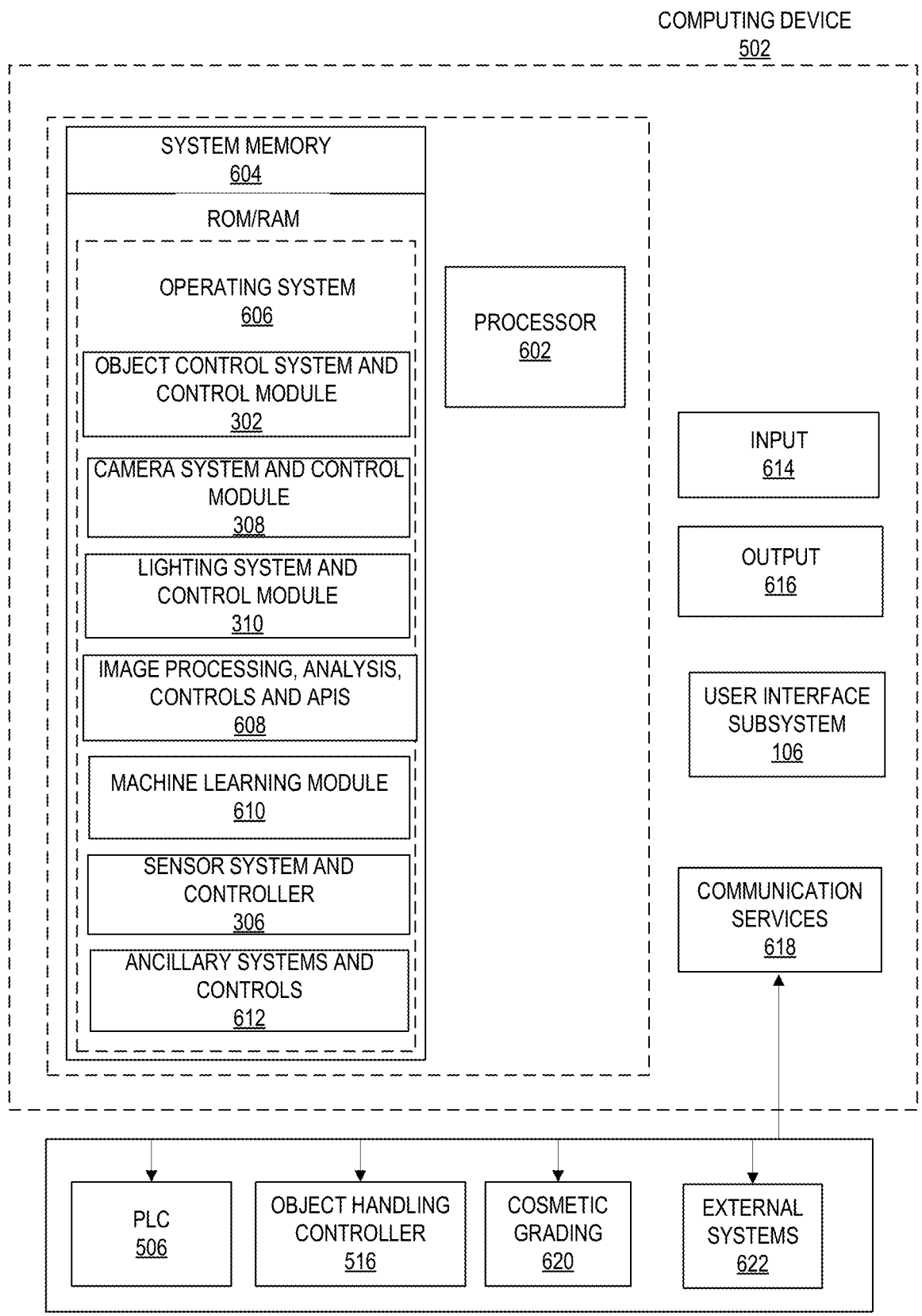
FIG. 6 is a block diagram illustrating an exemplary computing device consistent with this disclosure.

An exemplary computing device 502 consistent with the system and method of this disclosure is illustrated in FIG. 6. The computing device 502 may comprise at least a processing device 602, system memory 604, an operating system 606, computer-executable instruction modules which when executed by the computer cause the system to behave consistent with their functions (i.e. automated handling system and controls 302, 516, camera system and controls 308, lighting system and controls 310, 506, 510, 512 and 514, image processing controls and APIs 608, machine learning module 610, advanced optical sensor system and control 306, 520 and ancillary systems and controls 528, 612), input 614 and output 616 devices, graphical user interface subsystem 106 communication services 618 among modules and to outside systems including the PLC 506, the automated object system 302, 516 and cosmetic grading logic 620 and external customer systems 622, if required. A "computing device" 502 may be comprised of many processing devices and memory units on one machine or across many distributed machines with network communications.

Although no external integrations are required for the disclosed system to perform its functions, the system may be integrated with customer external systems 622, such as return logistics applications for which inspection and cosmetic grading may be an integral activity. These systems may provide optional object profiles including data, such as object identification, color, size, etc., that may aid in performing inspection and cosmetic grading and returning a grade, dispositional path, or recommendation for repair or replacement parts. Further, the inspection and cosmetic grading system logic may be hosted by an external system and accessed via a communications device.

In a preferred embodiment, image processing and analysis 608 comprise computer-executable instructions which when executed by the processor stitch the various images together to provide a full, two-dimensional view of the object 702 and identify, locate and determine the dimensions of defects, providing a full characterization of a defect. A deep learning algorithm 610 trained on a large number of images with identifiable defects and dimensions. For example, at a minimum, 2000-3000 images from each side and orientation of the object, with identifiable dents, scratches, and other defects may be required. A trained deep learning method 610 can efficiently locate defects or imperfections and identify and classify defects by their type and dimensions based on a trained set of previously categorized data. Many types of algorithms are available for this purpose, including neural network, convolutional neural network, support vector machines, and others. In an embodiment consistent with this disclosure, deep learning methods may separate and classify defects from the background and from dust, lint or reflection or other contaminants or artifacts not related to the surface being processed. In a system and method consistent with this disclosure, the system performs classification tasks directly from images, comparing the information provided in the image with trained data to determine the number and characteristics of defects, including the number, type and size of each defect.

Image capture and processing and analysis modules 608 may serve several functions: (1) determine a coordinate center of the object evaluation area, and other object attributes such as size and color, from an initial image, (2) create an integrated image by stitching all the images for an evaluation area into one; (3) identify and locate defects 704, (4) calculate the coordinates of the defect 706 relative to the center of the object evaluation area, (5) determine the location of the highest intensity light reflection for each defect 708, and (6) identify the dimensions 708, 710 and 712 of each defect.

Figure 7:
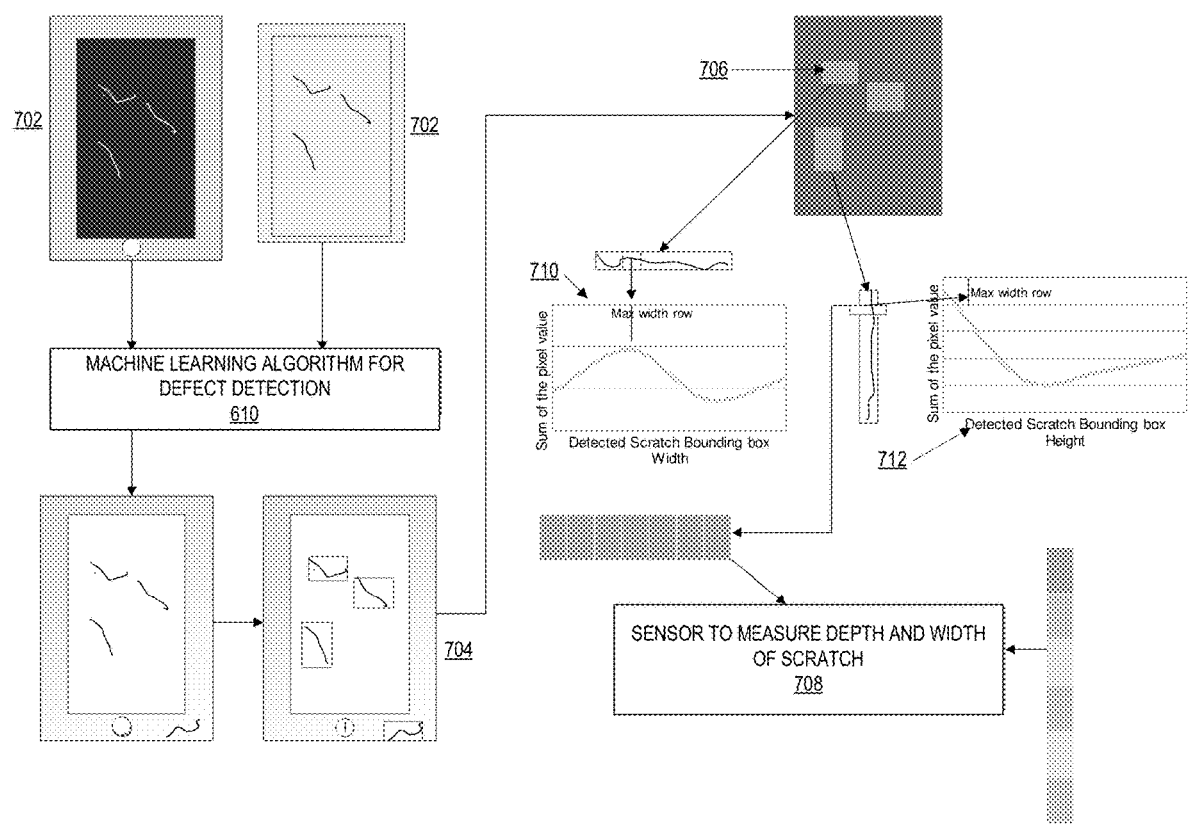
FIG. 7 illustrates the processes performed by an exemplary image processing system consistent with this disclosure.

FIG. 7 illustrates the processes performed by an exemplary image processing and analysis system 608. As is illustrated here, image processing creates the combined image 702 for the evaluation area. Deep learning methods 610 may then be used to locate and detect defects and calculate the dimensions of the defect by extracting information from each pixel, that information comprising information relevant to a two-dimensional characterization of a defect: (1) the presence or absence of a feature (defect) 706; (2) a value of reflected light intensity 714; (3) the dimensions of the pixel 710, 712; and (4) RGB color values. Deep learning algorithms may use this information to determine the dimensional characteristics of defects in a new evaluation area by comparison.

An initial image, such as the one captured in ambient light 514, may be used to determine the center of an object's evaluation area. If an object profile comprising color and size information about the object has not been provided by an external system, image processing software may identify the color and size of the object and provide this information to the lighting 310 system which makes automatic adjustments for the optimal lighting conditions. The center of the object evaluation area may provide the origin, or center point for calculating coordinates of defects, as will be described further below. The coordinates may guide an automated object control 302 system to grip to and pick up the object, place it in front of a camera 308 and align it properly for optimal lighting (e.g. lighting configuration, distance from object and lighting intensity) in conjunction with the lighting system controller 310, 508.

Figure 8:
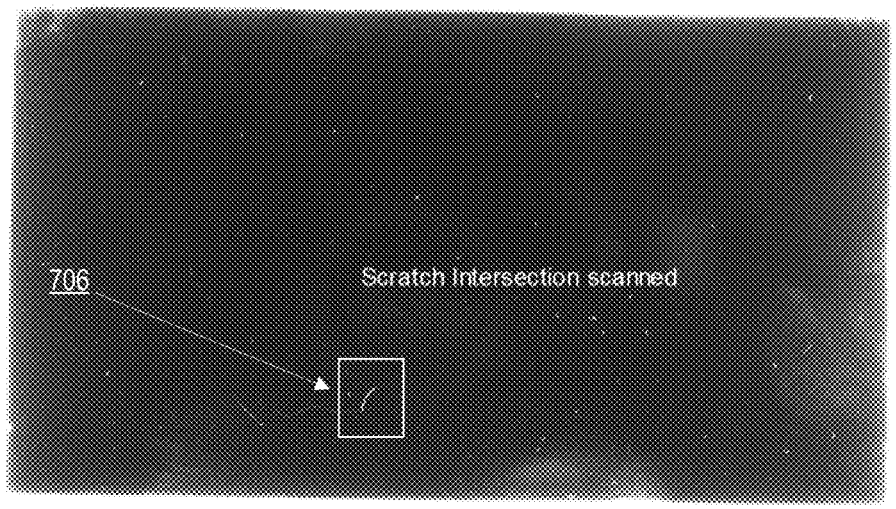
FIG. 8 is a screen shot of an image defect located by an image processing system.
Figure 9:
FIG. 9 is a magnified screen shot of the image defect of FIG. 8.

The coordinates of defects determined by the image processing and analysis 608 modules may be provided to the automated object control subsystem controller which may move and position the object in front of the sensor 306 at the location of the defect. The width 710 and length 712 may be calculated from pixel analysis as illustrated in FIG. 7. The highest reflective light intensity row/column of the defect may be located 708 as well. The coordinate location of the highest reflective light intensity may be fetched by the sensor for depth measurement. FIGS. 8 and 9 are screen shots of an image of a defect 706 located by the image processing system. FIG. 9 is a magnified view of the image in FIG. 8.

Figure 10:
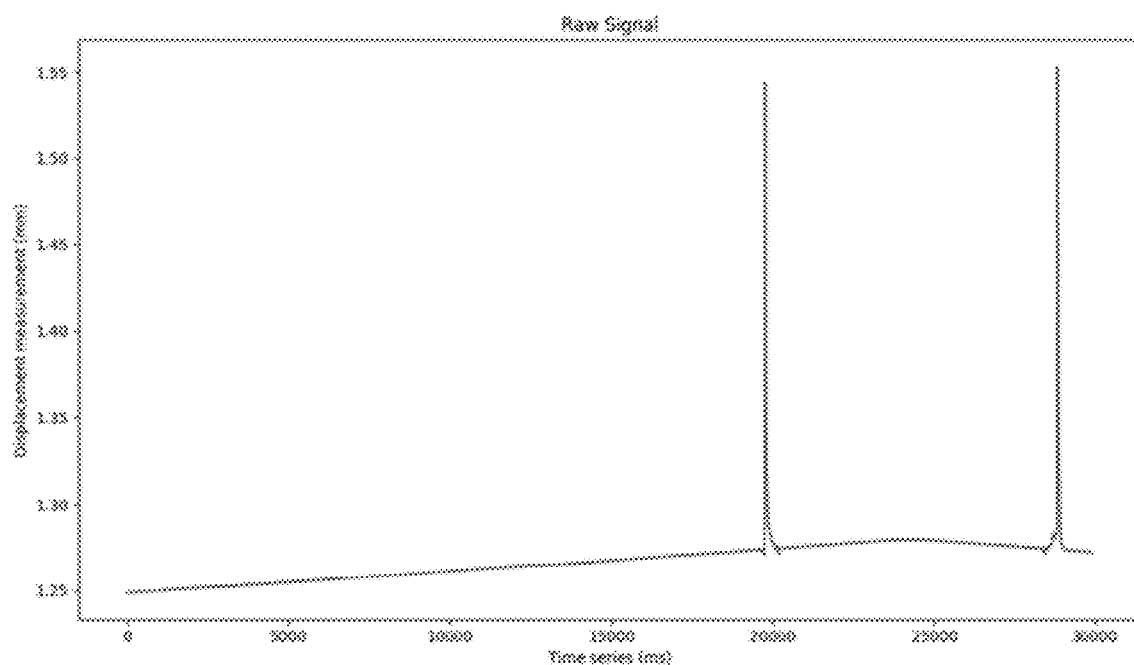
FIG. 10 is a screen shot of the raw sensor signal received at the sensor controller.
Figure 11:
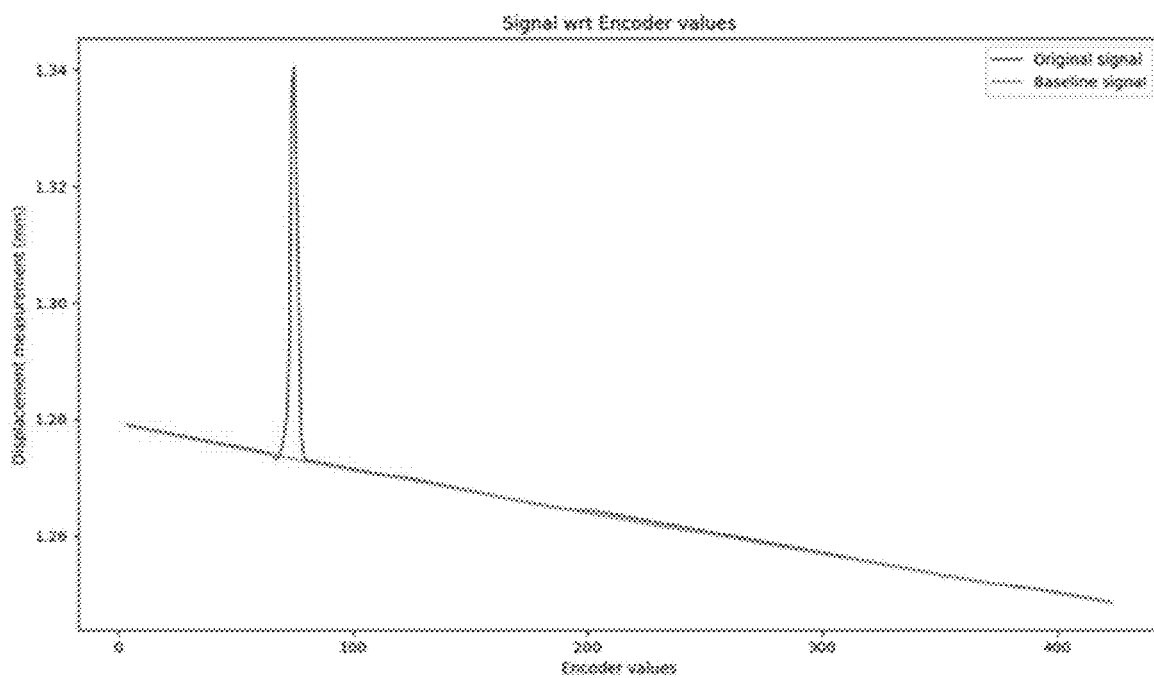
FIG. 11 is a screen shot of the signal of FIG. 10 with respect to encoder values.
Figure 12:
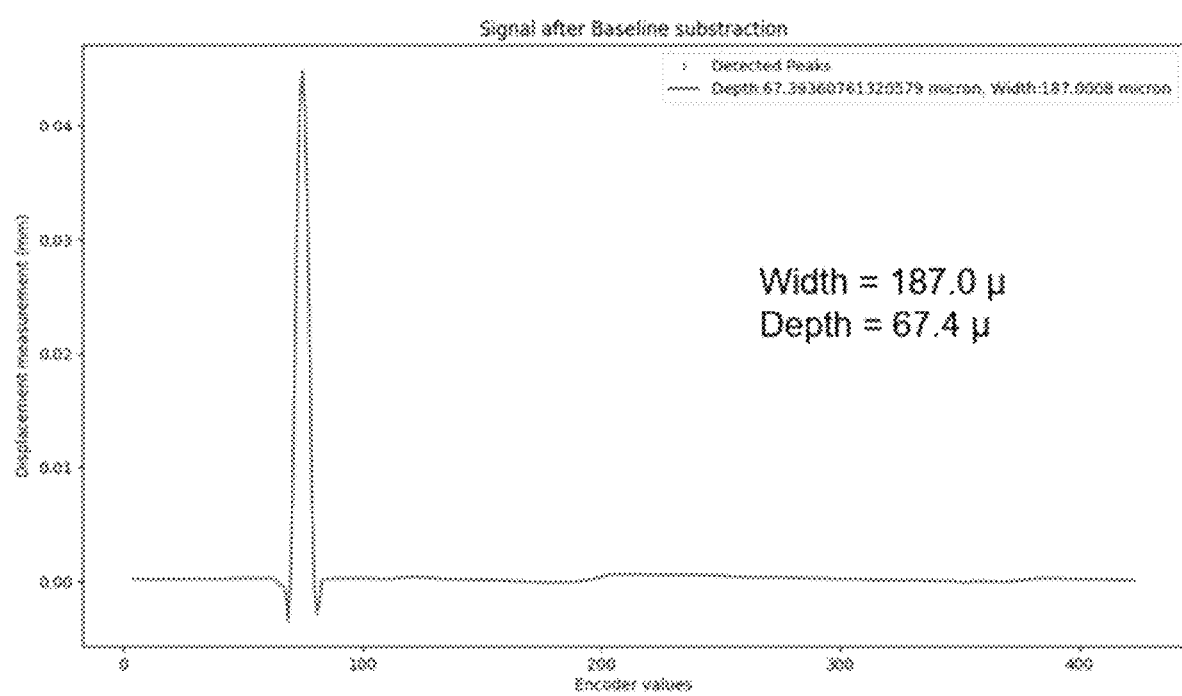
FIG. 12 illustrates the measurement signal received after baseline subtraction and illustrates the average width of the defect and depth as calculated by the sensor controller.

Referring back to FIG. 7, in order to determine depth, the coordinates of the defect at its point of highest reflected light intensity may be conveyed to the PLC 506 of the automated object controller 302. The automated object controller 302 may move the device to the sensor at the cross section of the scratch where the reflected light is at its highest intensity. Sweeping the sensor 306 optical spot perpendicular to the scratch or defect at the point of highest reflected light intensity provides a highly accurate measurement of the displacement; the depth of the scratch, or the height of a protrusion. Signals are sent to the sensor controller 520 which processes the signals for width and depth measurements. FIG. 10 is a screen shot of the raw optical sensor signal received at the sensor controller. FIG. 11 is a screen shot of the signal with respect to encoder values, and FIG. 12 illustrates the measurement signal received after baseline subtraction and illustrates the average width of the defect and the depth as calculated by the sensor.

An image processing and analysis module 608 may further identify whether the number or dimensions of defects put the object into a particular pre-defined cosmetic grading category according to the logic provided for cosmetic grading 624. Images and results for a particular object may be stored as an object record, along with its unique identification (e.g. serial number, asset ID) in a system data store for business history and research.

Method for Cosmetic Grading

Figure 13:
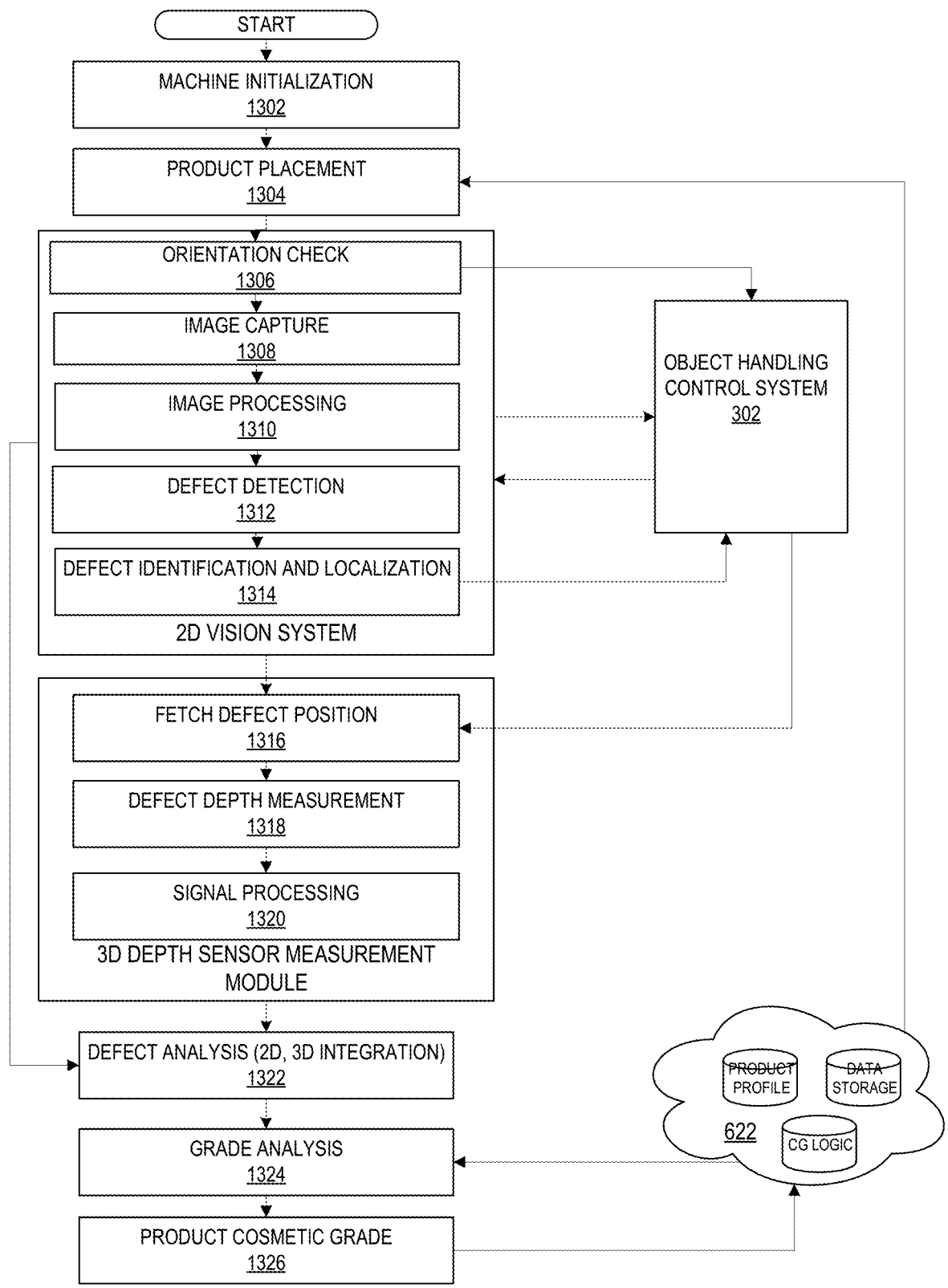
FIG. 13 illustrates the flow of a method performed by a system consistent with this disclosure.

FIG. 13 illustrates the flow of an exemplary method consistent with this disclosure. This example describes the evaluation of a handheld cellular device by an inspection, image processing and cosmetic grading system. The machine is initialized 1302, with all components in their home position. The cellular device may be conveyed to the machine 1304 by any number of standard conveying or handling systems 202 or may be placed directly into the system. An object handling system 302 determines the orientation of the item 1306. The object may be positioned in front of the camera 308 and light assembly 310 by the automated object control extension 304. The system determines the optimal lighting and focal settings and adjusts the lighting and camera assemblies accordingly. An initial image provided to image processing 1310 allows calculation of an origin or center of the evaluation area in order to provide a reference for locating defects. A series of images may be captured as the automated object control 304 rotates the device to allow the camera to capture images of the evaluation area from all angles and positions 1308. Image processing and analysis software, discussed and illustrated in FIG. 7, processes the images and combines them into a single, two-dimensional image of the device 1310. The combined image may then be fed to a deep learning algorithm 610 to detect defects 1312 on the surface of the object. Additionally, the data may be fed to a deep learning training system for model refinement.

The image processing and analysis 608 module may locate the defect and determine the width and length of a defect and the location of the highest reflected light intensity pixel 1314 for the defect. The image processing and analysis module 608 further calculates the coordinates of the location of the highest reflected light intensity pixel relative to the center of the evaluation area. The object handling control system 302 may fetch the coordinates for each defect at that location and may place the item in front of an advanced optical sensor at the defect location. For each such location, the optical sensor is swept perpendicular to the scratches at the points of greatest displacement (highest reflected light intensity pixel) 1318. Signals sent by the sensor to signal processor 520 determine the width and depth 1320 measurements. Defect analysis 1322 correlates the two-dimensional image data with the depth measurement of a defect to provide a comprehensive characterization of the defect. Other defects, such as discolorations, may be evaluated using the data extracted from image processing. For example, a discoloration may be located by reviewing the RGB values of neighboring pixels. The data from each source is added to a profile 622 and conveyed to the computing device where it is stored with the images for historical record of the product profile and used for defect analysis 1322, deep learning system training and grade analysis 1324. A cosmetic grade may be determined and assigned the appropriate grade level and disposition 1326 based on cosmetic grading logic 622. The cosmetic grading module may also provide a list of parts or processes required to bring a lower-graded item to a high grade. The object may then be conveyed to the appropriate bucket or bin for shipment to a vendor identified for the optimal disposition.

Figure 14:
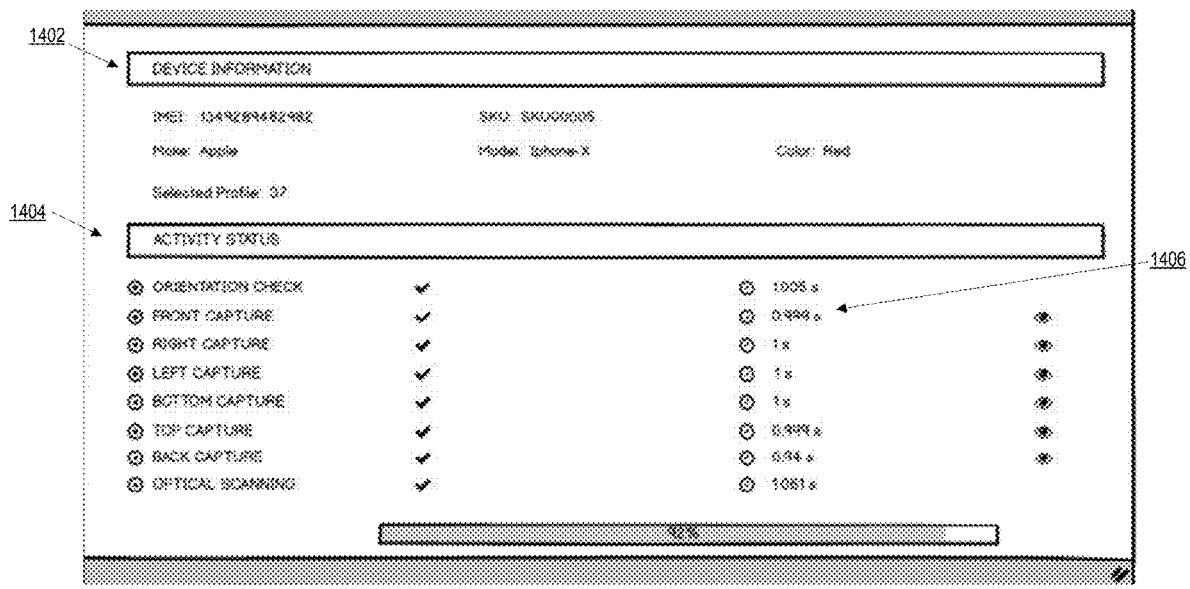
FIG. 14 illustrates an exemplary screen shot for monitoring the process as it proceeds.
Figure 15:
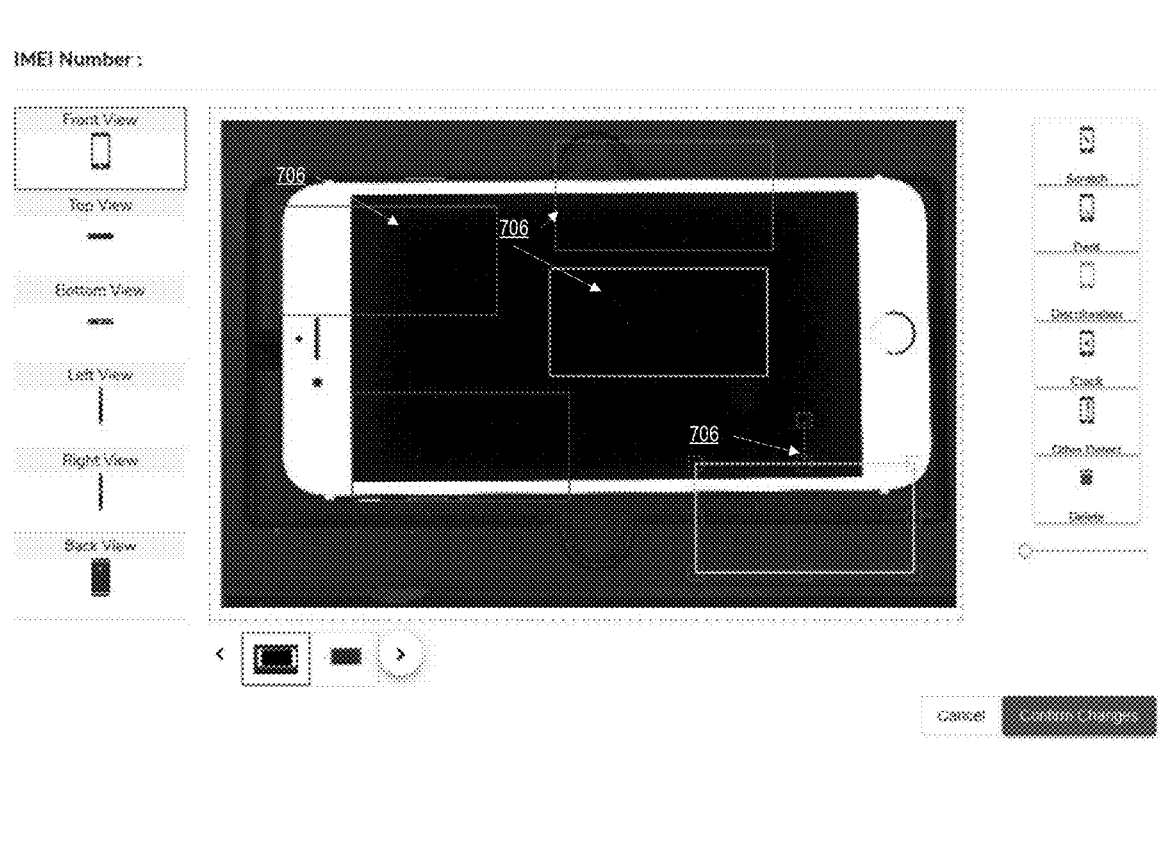
FIG. 15 is a screen shot of a view of a mobile device with defects identified by image processing software.

As was illustrated above, an operator may have access to view or control the process through an interactive user interface 106. The interface may be accessed using the PC, a remote computer, a touch screen located on the inspection machine, by mobile phone, or other device with a network connection. The user or operator may view the process as it proceeds, as is illustrated in FIG. 14. Here, the user may view the item currently under inspection 1402, including its identifying information, color, make and model and the selected profile for the item. The user may also view the activities 1404 as they progress and the duration of each operation 1406. Other screens allow the user to input or correct information. For example, if there is an IMEI/color mismatch in an item profile coming from an external system, the user may correct the color using a profile capture screen. FIG. 15 is a screenshot of a view of a mobile device 1502 with defect identified by bounding boxes. The operator may view images 1504 from all sides of the device and verify identification of each type of defect 1506.

Figure 16:
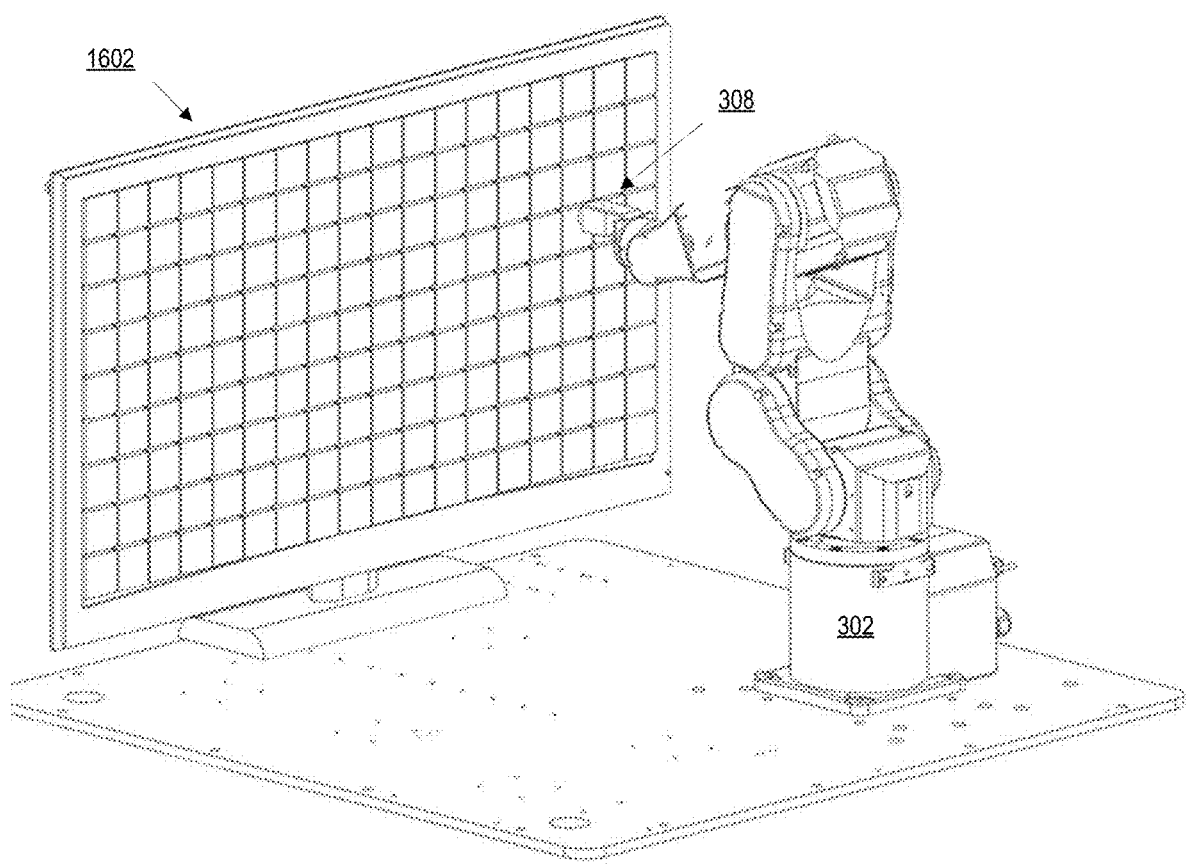
FIG. 16 is an illustration of an alternative embodiment for capturing images in larger objects.

As was discussed previously, alternative embodiments are contemplated for inspection and cosmetic grading of larger objects. For example, a large screen television, which cannot be picked up and rotated may be made stationary while the camera is held by the automated object control with the subsystems moving around the object in order to capture the required images. FIG. 16 provides an illustration of such an automated object control 302 (here, a robotic arm)/camera 308 and object 1602. Not shown are the enclosure 102, the image processing 608 and lighting subsystems 310, which perform their functionality consistent with earlier described embodiments. Also not shown is the sensor system 306, which is contemplated in some embodiments to be operatively connected to an automated object control 302, which receives from the image processing system 608 coordinates for defects and high intensity pixels and may be positioned at the coordinates to measure precise width and depth of a defect. In some embodiments, the automated object control mechanism may replace the camera with the sensor following image processing, measuring depth according to the coordinates provided by the image processing system.

Still other embodiments of the disclosed system and method may be adapted for use with larger products. For example, a car may be cosmetically graded or evaluated in a drive-in enclosure equipped with an arm 302 that may support the camera and lighting system. The arm may revolve around the vehicle capturing images of the entire vehicle. Image processing may determine the coordinates of a defect and provide the coordinates to the sensor 306 for depth measurement. These examples are not to be considered limiting and are for illustration only. Alternative embodiments may be adapted for the size, or other special requirements for inspecting defects on an object surface, where the embodiments comprise the components disclosed herein in alternative configuration and function.

The system and method disclosed herein comprises a computing device and various hardware component (i.e. positioning automation, cameras, lighting, sensor) subsystems, each with programmable controllers that provide the logic for each subsystem to perform its role in the system. Users may program the controllers by writing executable code on the computing device and transferring it to the controller.

A computing device 502 may also be referred to as a computer or server. Software applications, comprised of computer-executable instructions stored in non-transitory memory or non-transitory secondary storage for execution by a processor are operatively configured to perform the operations as described in the various embodiments. The software applications may correspond with a single module or any number of modules. Modules of a computer system may be made from hardware, software, or a combination of the two. Generally, software modules are program code or instructions for controlling a computer processor to perform a particular method to implement the features or operations of the system. The modules may also be implemented using program products or a combination of software and specialized hardware components. In addition, the modules may be executed on multiple processors for processing a large number of transactions, if necessary or desired.

Although the computer, computing device or server 502 has been described with various components, it should be noted that such a computer, computing device or server can contain additional or different components and configurations. In addition, although aspects of an implementation consistent with the system disclosed are described as being stored in memory, these aspects can also be stored on or read from other types of computer program products or computer-readable media, such as secondary storage devices, including hard disks, floppy disks, or CD-ROM; a non-transitory carrier wave from the Internet or other network; or other forms of RAM or ROM. Furthermore, it should be recognized that computational resources can be distributed, and computing devices can be client or server computers. Client computers and devices (e.g.) are those used by end users to access information from a server over a network, such as the Internet or a local area network. These devices can be a desktop or laptop computer, a standalone desktop, or any other type of computing device. Servers are understood to be those computing devices that provide services to other machines, and can be (but are not required to be) dedicated to hosting applications or content to be accessed by any number of client computers. Operations may be performed from a single computing device or distributed across geographically or logically diverse locations.

Communications between subsystems may be driven by computing device executable code by some type of interface, such as ethernet, Bluetooth, USB, or other connection. Remote access by customers or users may be provided by web services or networks. A computing device may transmit network-based services requests to external systems networks via external networks. In various embodiments, external networks may encompass any suitable combination of networking hardware and protocols necessary to establish network-based communications between clients and service provider network. For example, a network may generally comprise various telecommunications networks and service providers that collectively implement the Internet. A network may also include private networks such as local area networks (LANs) or wide area networks (WANs) as well as public or private wireless networks. For example, both a given client and service provider network may be provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a link between a client and the Internet as well as between the Internet and a service provider network. It is noted that in some embodiments, clients may communicate with server provider network using a private network rather than the public Internet.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, means, methods and steps described in the specification. As one of ordinary skill in the art will readily appreciate from the disclosure, processes, machines, manufacture, means, methods or steps presently existing or later to be developed that perform substantially the same function or achieve substantially the same result as the corresponding embodiments described herein may be utilized according to the present disclosure. Accordingly, the appended claims are intended to include within their scope such processes, machines, manufacture, means, methods or steps.

What is claimed is:

1. A device for inspecting and evaluating object surface defects, comprising:

a computing device with one or more processors and memory;

an automated control system controlled by a processor, operatively configured to receive instructions from a control module comprising computer-executable instructions which when executed by the processor direct the automated control system interaction with an object comprised of one or more materials;

an image capture subsystem controlled by a processor, operatively configured to determine image capture conditions, direct lighting system adjustments, capture images of objects and transmit image signals to an image processing module;

a lighting subsystem controlled by a processor and operatively configured to receive and follow instructions from the image capture subsystems regarding lighting conditions, wherein the lighting subsystem makes adjustments to illumination placement and intensity as directed by the image capture subsystem;

an image processing module stored in computing device memory which when executed by a processor performs image processing steps comprising: (i) receiving a signal from the image capture subsystem (ii) processing the signal to capture an image of an object, (iii) determining the two-dimensional coordinate center of the object evaluation area, (iv) detecting, segmenting and classifying the type of each surface defect using deep learning algorithms, (v) measuring defect length and width, (vi) determining the point of highest reflective light intensity for each defect (vii) calculating coordinates for identified defects with respect to the coordinate center of the object evaluation area, (viii) transmitting the coordinates of a defect to the automated object control processor and (ix) storing images and data in memory; and an optical spot sensor subsystem controlled by a processor and operatively configured to measure the depth or protrusion height displacement of a defect at a surface location identified by the image processing module as the point of highest reflective light intensity, such spot sensor measuring depth when the automated control system aligns the object and optical spot sensor at the defect coordinates calculated by the image processing module with reference to the coordinate center of the object face.

2. The device for inspecting and evaluating object surface defects of claim 1, wherein the image processing system evaluating the image for defects further comprises a machine learning system comprising one or more deep learning algorithms and large data sets wherein a deep learning algorithm is chosen from the group: neural network, convolutional neural network, and support vector machine algorithms.

3. The device for inspecting and evaluating object surface defects of claim 1 wherein the computing device further comprises a cosmetic grading module comprising computer executable instructions that determine a cosmetic grade and recommended disposition for the object based on the number and type of defects and a severity for a defect determined by the length, width and depth of a defect and further directs the item to the appropriate bin or bucket for shipment to a final disposition.

4. The device for inspecting and evaluating object surface defects of claim 1, where the computing device further comprises a user interface configured to allow manual input, control and process observation.

5. The apparatus to inspect and evaluate object surface defects of claim 1, wherein the computing device further comprises a communications module providing access to external systems wherein the external systems may provide an object profile comprising identifiable information and attributes for an object.

6. A method for automating determination of a cosmetic grade for an object, comprising:

capturing by an image processor, a signal from an image capture subsystem and processing the signal to capture an image of an object;

determining, by the image processor, the coordinate location of the object evaluation area physical center and storing the information in a database;

transmitting, by the processor, the coordinate location of the object evaluation area physical center to an automated object control system processor;

positioning the object, by an automated object controller controlled by the control system processor, in front of a camera in multiple orientations;

capturing, by the camera, an image for each of the orientations for which the object was placed by the automated object control system, combining the image for each orientation into a comprehensive image and storing the images in memory;

applying one or more deep learning algorithms to the comprehensive image, the deep learning algorithm trained to recognize types of defects expected on the surface of the object and to determine and locate surface defects on the object from the comprehensive image and deep learning algorithm;

calculating the coordinates of each identified defect relative to the object evaluation area physical center, the coordinates comprising at least the location of the defect pixel of highest light intensity;

counting the number of defects;

locating the defects on the object and measuring the length and width of the defects;

measuring the depth of a defect by selecting one method from the group consisting of (i) aligning an advanced optical spot sensor with the defect based on the coordinates of the defect relative to the coordinate center of the object and sweeping the sensor spot across the point of highest reflected light intensity; and (ii) applying a machine learning algorithm trained with data collected from advanced optical spot sensor measurements of depth correlated with reflected light intensity at a surface location on the object assigning a cosmetic grade to the object based on applying pre-defined object-specific rules and logic for classifying the cosmetic condition of the object according to an evaluation of the located defects and their measurements; and conveying the object to its final disposition according to its cosmetic grade.

7. The method for automating determination of a cosmetic grade for an object of claim 6, wherein the locating step performed by one or more deep learning algorithms and large data sets wherein the deep learning algorithms are chosen from the group: neural network, convolutional neural network, and support vector machine algorithms.

8. The method for automating determination of a cosmetic grade and disposition for an object of claim 6, where the measuring step further comprises an image processing system to measure length and width.

9. A method for inspecting and evaluating the condition of an object by, comprising:

capturing, by a processor, an image of an object;
determining, by a processor the two-dimensional coordinate center of the object evaluation area;
locating, by an image processing module comprising memory, a processor and computer executable instructions stored in memory, which when executed by the processor, (i) perform detection, location, segmentation and classification of defects on the surface of the object; (ii) the point of highest reflected light intensity for each defect; (iii) defect length and width, and (iv) the coordinates for identified defects with respect to the coordinate center of the object evaluation area;
measuring the depth of a defect at the point of highest reflected light intensity, wherein depth is measured by selecting one method from the group consisting of: (i) sweeping an advanced optical spot laser sensor perpendicular to the defect at the point of highest reflected light intensity, and generating a vertical displacement signal and (ii) applying a machine learning algorithm trained with data collected from advanced optical spot sensor measurements of depth correlated with reflected light intensity at a surface location on the object;
collecting and storing the data in memory;
applying a cosmetic grade for the item based on predefined rules and logic and an evaluation of the located defects and their measurements.

10. The method for determining the depth of a surface defect claim 9, wherein the computing device further comprises a communications module providing access to external systems.

* * * * *